Feb. 15, 1955
C. W. WALTER
2,702,034
APPARATUS FOR COLLECTING, STORING, AND DISPENSING WHOLE BLOOD
Filed July 20, 1950
2 Sheets-Sheet 1
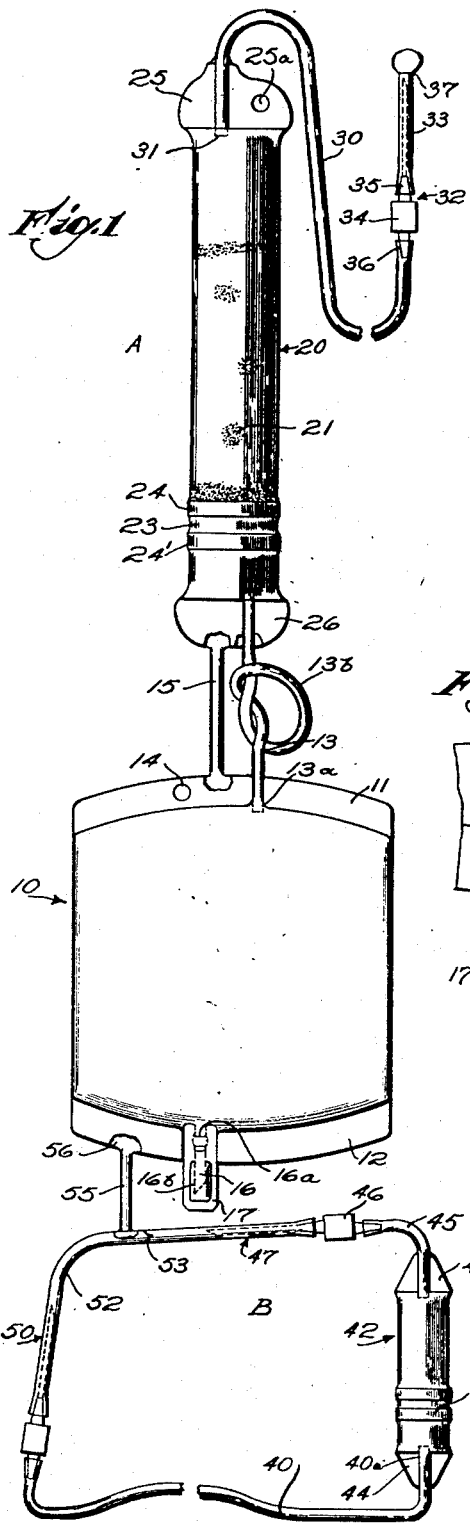
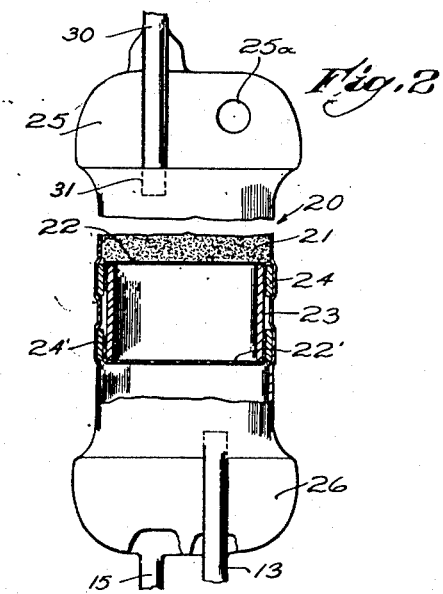
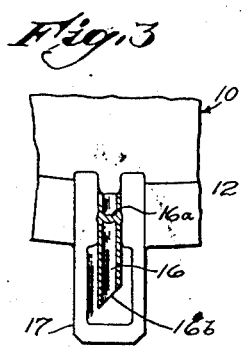
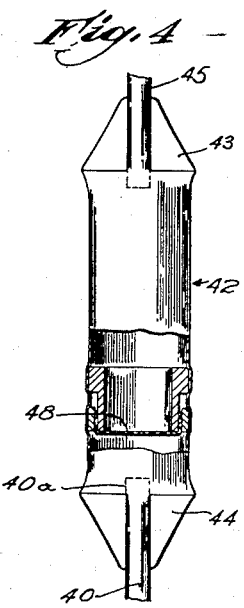
Inventor
Carl W. Walter
by Emery, Booth, Townsend, Miller & Widner
Att'ys.

Feb. 15, 1955 C. W. WALTER 2,702,034
APPARATUS FOR COLLECTING, STORING, AND
DISPENSING WHOLE BLOOD
Filed July 20, 1950 2 Sheets-Sheet 2
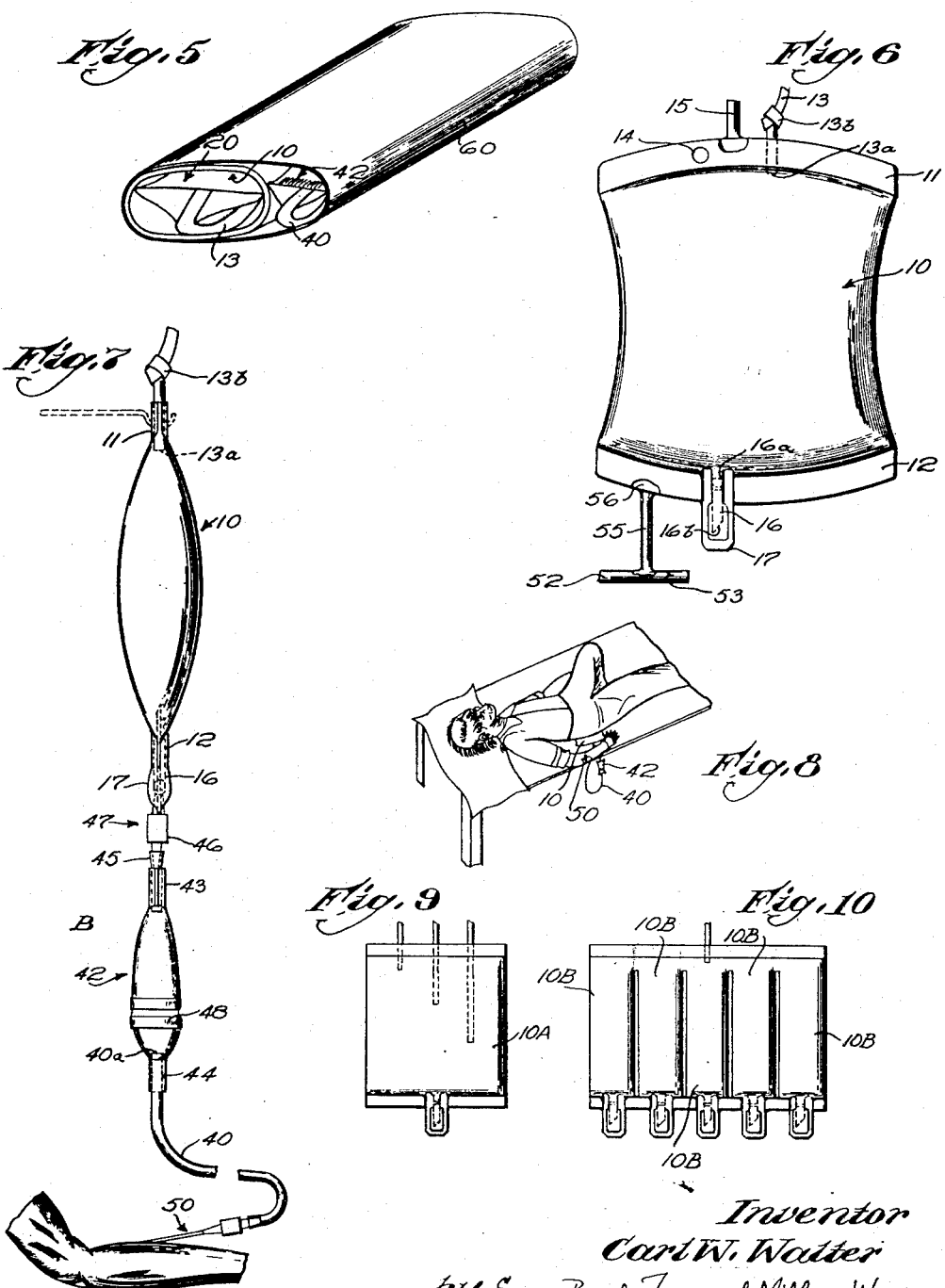
Inventor
Carl W. Walter
by Emery, Booth, Townsend, Miller + Weidner
Att'ys.

United States Patent Office 2,702,034
Patented Feb. 15, 1955

2,702,034

APPARATUS FOR COLLECTING, STORING, AND DISPENSING WHOLE BLOOD

Carl W. Walter, Holliston, Mass., assignor to Fenwal Incorporated, Ashland, Mass., a corporation of Massachusetts Application July 20, 1950, Serial No. 174,891

27 Claims. (Cl. 128—214)

My present invention relates to the collection, storage, and dispensing of whole blood, and more particularly to novel technic and apparatus for the preservation and use of human blood as unadulterated, undistorted tissue for blood banking purposes. It aims to provide a bacteriologically safe technic together with a minimum of equipment requite therefor and which is adapted for universal use as in hospitals, collecting stations and especially under emergency and field conditions, the apparatus being constituted as a set or unit compactly stowable in small compass and when filled with blood being capable of withstanding transportation hazards including those of delivery from the air.

The nature and characteristic features of my invention will be better understood from the following description taken in connection with the accompanying drawings illustrative of apparatus embodying the invention, and by which the methods thereof may be practiced, and in which:

Fig. 1 shows one entire unitary set of elements comprised in the system and apparatus;

Fig. 2 is an enlarged view partly in section of the ion-exchange column;

Fig. 3 is an enlarged fragmentary view of the container outlet;

Fig. 4 shows the drip chamber on a scale generally corresponding to Figs. 2 and 3;

Fig. 5 on a similar scale as Fig. 1 illustrates the packaged condition of the unfilled apparatus;

Fig. 6 illustrates the filled and sealed container as in storage and transport;

Figs. 7 and 8 show the infusion phase of the apparatus under gravity and under positive pressure feed respectively; and Figs. 9 and 10 illustrate modifications of the flexible-walled container, on a smaller scale.

The obtaining and handling of human whole blood poses numerous problems. Open air contact is to be avoided, along with any possibility of occlusion of air, both during collection and administration of the blood. A slow rate of collection is desirable for minimal physiologic disturbance to the donor. The instrumentalities must withstand sterilizing temperatures. Toxic anti-coagulants including the citrate radical should not be used, yet coagulation and degradation of the blood must be prevented or delayed, along with retarding of platelet aggregation and chemical change. Further, logistic considerations in times of war and disaster make it desirable that the apparatus be compact and light in weight.

An important feature of the invention whereby these problems are largely solved is the provision of a flexible-walled deformable container for the blood, serviceable both as the receiving and the dispensing reservoir and making possible positive pressure infusion to the recipient with freedom from outside air contamination. Such container forms a central element incorporated in a closed sealed system and apparatus which presents in contact with the blood only sterile impermeable surfaces which also at least as to the coagulative elements of the blood are of a non-wettable or coagulation-repelling, chemically inert and non-reactive glossy character substantially eliminating any liquid-gas interface between the blood and the retaining wall. The several coordinated elements are low enough in cost to be discardable after a single use in ordinary practice, but are capable of re-use under emergency conditions without the hazard of pyrogen reactions.

A further important feature of the present invention is the incorporation of a coagulation-preventing ion exchange column directly into the unitary apparatus whereby such column is herein first employed with and adapted to the continuous flow of blood into storage or elsewhere.

Referring now to the drawings in more detail and first more particularly to Figs. 1 and 5, the apparatus as a whole comprising the blood-handling set or equipment unit is composed of three correlated main elements. First, and serving as the common or intermediary base element mechanically and functionally correlating the others, is a receptacle or container designated generally at 10. In accordance with the invention this container or reservoir is fashioned as a flexible-walled deformable bag or bladder.

Connected at one portion or end of the bag 10 is a group of parts or sub-set designated generally at A to be referred to as the donor or blood collecting element. At an adjacent or other portion of the bag 10, herein at the opposite or dispensing end a group of parts designated B constitutes the infusing element or recipient sub-set.

The donor and the recipient elements A and B comprise lengths of flexible tubing and inserted tubular chambers, and are connected to or connectible with the bag 10 in filling and in dispensing relation respectively.

The deformable bag 10 together with the flexible tubing and the chambers of the elements A and B, the inner wall surfaces of which are to have contact with the blood, are in accordance with the invention fabricated of an elastomeric thermoplastic resin selected for characteristics especially adapting it to the present purposes. These primarily include impermeability, tensile and flexural strength and also impact strength and general toughness, plus stability to sterilizing temperatures of at least 120° C., coupled with capacity for hermetic sealing by heat. Of equal importance is that the surface shall be chemically clean, inert and non-reactive as generally characterized by a glossy-smooth and mirror-like texture, providing good tissue tolerance and substantially non-wettable by the liquid here concerned, namely, blood, so as to delay, repel or prevent coagulation and degradation of the blood as previously and later herein stated. Such anti-coagulative property for the special blood-contacting surfaces or films thereat as herein disclosed is concerned with retarding, repelling or preventing the coming together of the formed elements of the blood, especially the red and the white cells and the platelets. Therefore I herein refer to this property as hemorepellence, said elements being delayed, repelled or prevented for whatever reason from that conjunction which characterizes blood coagulation, thereby serving a similar function in this respect as normal endothelium where the acidic polysaccharide, mucoidin, acts as the hemorepellent. Preferably the material is transparent or substantially so to facilitate use of the apparatus. Equipment fabricated of a polyvinyl chloride resin base material as for example a polyvinyl chloride acetate copolymer has been found to meet all the requirements. Other materials which have been found suitable include a polymer of trichlorofluoroethylene such as known commercially as Kel F; also a polyethylene compostion, which latter however is unstable at 120° C. and therefore not susceptible of sterilization by the conventional "time and temperature" or heat method, but which may be sterilized in some other manner, as by X-ray or other radiation, as hereinafter mentioned. It is understood that the component material presenting the described properties and characteristics for the elements of the apparatus here concerned, whether of the polyvinyl chloride class or otherwise, are appropriately plasticized for the fabrication thereof.

The bladder-like container 10 may be fashioned by extrusion of the plastic in tubular form. An appropriate length to form a bag of the desired volume is cut off and sealed across the ends by heating to the melting point and fusing or self-welding by application of di-electric, infrared or other caloric energy. Thus integrally and hermetically sealed closure strips 11, 12 are formed at the bag ends. These desirably follow a flat transverse arc, making the ends slightly convex in the flatwise collapsed state of the bag, aiding drainage thereat. By way of example, a 12.5 cm. laid-flat tubing of 0.25 mm. wall gauge and averaging about 15 cm. in length between the end seals 11, 12 provides a highly satisfactory bag accommodating an adult bleeding volume of 500 cc. or approximately one pint. A bag 10 so constructed and filled with blood readily withstands pressures up to 50 lbs. per sq. in. and impact shocks equivalent to a free fall of 300 ft. onto a rigid platform. At the same time the relatively thin flexible wall of the bag enables it to be completely collapsed flatwise before filling, ridding it of air and precluding any appreciable liquid-gas interface.

Inlet and outlet means are integrally installed on the bag 10. These may be variously arranged. Preferably they are at opposite ends of the bag, and oppositely offset with reference to the vertical median line. At the upper end of the bag as viewed in Fig. 1 a length of transparent flexible and elastic tubing 13 of the described material has one end inserted into the bag before the latter is sealed and is integrally fused in position extending through the bag sealing strip 11 in the formation of the latter, so that the tubing opens freely into the bag as at 13a. The other end of the tubing 13 is similarly secured in sealed communication with one end of the ion-exchange column 20 to be described.

This tubing 13 and the other tubing lengths comprised in the donor and recipient sets A and B is made of the stated plastic material extruded with a lumen 3 mm. in diameter, as a preferred size, a suitable wall gauge being 0.5 mm. It is heat sealable and is sufficiently elastic to afford and maintain a hermetic seal if a single throw knot in it, such as indicated at 13b, Fig. 1, is pulled up tightly under stretching and then released, as indicated at the upper right in Fig. 6.

The inlet tubing 13 having the initially loose sealing knot as in Fig. 1 may be relatively short, the ion-exchange column 20 in the recipient line being located adjacent the bag. To maintain this spacing and to support the weight of the bag and the content while at the same time relieving the tubing 13 of unintentional longitudinal strain tending to close the knot 13b, the bag 10 is linked to the adjacent end of the ion-exchange column 20 by a connection 15. This may consist of an appropriate length, for example about 3 inches, of the same flexible tubing integrally fused and united at its opposite ends to the upper margin 11 of the bag and to the lower margin of the ion-exchange column 20. Since this connection 15 is not to serve as a conductor, it need not be tubular and its ends are in any event closed off at the junction with the bag and the ion-exchange column respectively. For hanging the bag in use the end seal strip 11 at the inlet end is provided with a grommetted aperture 14.

The bag outlet is shown formed in the lower end-sealing strip 12 by a delivery tube 16 comprising a short length of the flexible tubing as for example 15 mm. or thereabouts inserted through and hermetically sealed into the end seal strip 12 during the formation thereof, similarly as for the inlet tube 13. This delivery tube 16 is initially closed by a pierceable diaphragm of about 1 mm. thickness formed of the like material, preferably at the inner end of the tube, as indicated at 16a. The other and open end 16b is left protruding and may be bevelled for guiding insertion of a piercing needle. A protective tubular sheath 17 of the similar plastic is installed over and completely encloses the protruding portion of the delivery tube 16, with the inner end integrally joined with the end seal 12 of the bag, preferably simultaneously with the formation thereof, preventing bacterial contamination at the outlet. This sheath 17 affords a second and outer seal for the delivery tube so that the bag is subject to a double seal at this location.

The donor set A connected to the receiving end 11 of the bag 10 in the described manner contains the ion-exchange column 20 already referred to; see Figs. 1 and 2. This consists of a tubular chamber fashioned of a flexible tube of the described plastic, an appropriate size being a tubing of approximately 28 mm. in diameter with a wall gauge of 0.5 mm. The chamber so formed is of a length to contain for example 50 grams (40% saturated) of a substance 21 having the capacity to decalcify the blood by ion exchange therewith, removing the coagulation-causing calcium and leaving the blood free flowing. One suitable and preferred substance for this purpose is a sulfonated polystyrene-divinyl benzene copolymer, plant grade, sodium cycle. As here used this resin is of a globular granular form, of an orange golden brown translucent appearance, the mass thereof contained in the chamber 20 being fluent therein in the manner of a medium-fine sand. The chamber volume in the column 20 is made adequate to afford sufficient space for swelling of the resin during sterilization and saturation. As noted this resin 21 is characterized by a capacity to sequester divalent ions and to liberate sodium in exchange; it satisfactorily serves this function when blood passes over it at a rate not exceeding 1 cc. per minute, per gram of resin.

The exchange resin 21 is supported in the chamber 20, with the latter vertical, by screening means adjacent the outlet end. A suitable screen is provided by nylon bolting cloth 22 of 100 mesh stretched taut over an inner supporting hoop 23 and clamped circumferentially under a concentric close fitting outer hoop 24. These hoops 23 and 24 are of substantial rigidity and preferably are formed of molded nylon. Spaced closely adjacent the first screen 22 is a second similar nylon cloth screen 22' serving as a protective retainer to insure complete trapping of the resin particles. The second screen 22' is similarly mounted by stretching over the end of the same or a separate inner hoop 23 and by clamping under an outer hoop 24'. This double retainer or supporting element is externally proportioned to have a tight fit within the wall of the column 20 where it may be held in place and peripherally sealed by fusing thereto.

The exchange column 20 is closed and heat sealed at its respective ends as indicated at 25, 26 in a similar manner as described for the formation of the bag 10. The adjacent end of the bag-connected inlet tubing 13 is extended through and sealed into the lower end seal 26, so as to open into the lower compartment of the exchange column, below the filter element 22—24. The end seal 25 at the other or inlet end of the ion-exchange column 20 has similarly hermetically sealed into and through it one end of a length of the flexible plastic tubing 30, Fig. 1, the column-entering open end being indicated at 31. For suspending the column the upper end seal 25 desirably has a hanger aperture or eyelet as at 25a.

The free end of the tubing 30 of the donor set A carries a phlebotomy or blood-letting needle designated as a whole at 32. Such a needle comprises a stainless steel (for example type 204) cannula 33 of 15 gauge having a coupling and manipulating portion at the end distal to the piercing point, including an intermediate body 34 of four-sided or other outside contour, preferably non-round, and aligned oppositely extending tapered conical hubs 35, 36 dimensioned to fit within and to seize to the plastic tubing. The cannula 33 extends uninterruptedly through the entire coupling element 34—36, to preserve laminar flow of the blood and to facilitate cleaning. The hub 36 at the end away from the needle point is made appreciably longer than and of a flatter taper than the other hub 35, providing additional tube anchoring surface and a firmer gripping action. The hub and coupling portion 34—36 may be of similar metal as the needle cannula, or of a more machinable metal, e. g. brass with chrom plating. In an embodiment found preferable for most use conditions this manipulating and coupling element is formed of a synthetic resin, e. g. nylon type FM3001, molded directly around the non-piercing end portion of the needle. In the completed ready-for-use state of the apparatus the cannula 33 of this phlebotomy needle 32 is protectively sheathed in a short piece 37 of the plastic tubing which is sealed off at one end and fitted over the shorter hub 35, which has a relatively steep taper to facilitate removal of the sheath. While needles as here described and illustrated, and which are disclosed and claimed per se in a copending application Ser. No. 174,890, filed July 20, 1950, are preferred for use in the apparatus and methods of my present invention, needles otherwise constructed may here be employed in some instances.

The recipient element or sub-set B of the apparatus, Figs. 1, 5, 7 and 8, consists of a length 40 of the plastic tubing sufficient for administering purposes, as for example 3 to 4 feet. Incorporated in this tubing, preferably near the end to be connected to the delivery tube 16 of the bag is a combined drip chamber and filter 42; see Fig. 4. This may be constructed of flexible tubing of the plastic described having a diameter of about 12 mm. and 0.5 mm. wall thickness. It is heat sealed at the respective ends as indicated at 43, 44 in a generally similar manner as for the bag 10 and the ion-exchange column 20. Installed through the sealed end 43 in the manner previously described is a short length 45 of the 3 mm. plastic tubing, adequate to receive the longer coupling hub 46 of a piercing needle 47, Figs. 1 and 7, which may be of the same construction and gauge as the phlebotomy type needle 32 of the donor set A. The flexible tubing 40 of the recipient set has one end entered through and sealed in the lower end 44 of the drip chamber and filter element 42 as indicated at 40a, opening from it below a filter unit 48 therein; see also Fig. 4. Such filter may consist of a single web of the 100 mesh nylon bolting cloth fixed in position by inner and outer concentric nylon hoops similarly as described in connection with the ion-exchange column 20 but dimensioned for tight fitting within this relatively smaller chamber element 42. At the free or delivery end of the longer tubing 40 of the recipient set B is installed the infusing needle 50 which may in all respects be similar to the needles already described except that the cannula desirably is of 19 gauge.

For sterile preservation prior to use the pointed ends of the piercing bag-connector needle 47 and of the infusing needle 50 of the recipient set B are inserted into the opposite ends of a short length 52, for example about 12 cm., of the described flexible tubing, the ends of which are forced up over and gripped to the corresponding shorter hubs of the respective needles. At an intermediate point spaced between the pointed ends of the two inserted needles the sheathing tube 52 is nicked as at 53 to permit escape of air and steam during sterilization.

In the completed pre-use status the entire apparatus is rolled and folded together into a compact package for shipment and storage, as illustrated in Fig. 5. It is held in the packaged form by a wrapper or envelope 60 which may be a flexible transparent plastic sleeve of the appropriate size to form a package of minimal dimensions and light weight. The recipient element B of the unitary apparatus desirably is further connected and kept available with the other elements by linking it to the bag 10 as by a severable connection 55, Fig. 1, generally similar to the link 15 between the bag 10 and the ion-exchange column 20. Such retainer link 55 may consist of a short length of the flexible tubing fused at one end to the lower closure strip 12 of the bag as at 56 and having the other end lapped about and fused on the needle-sheathing tube 52 leaving the channel in the latter open.

In completing and placing the apparatus in ready-for-use condition the entire unitary equipment set including the bag 10 and the donor and recipient sub-assemblies A and B is sterilized in any convenient manner, as by the application of heat at at least 120° C. for a continuous period of thirty minutes, as for example in an autoclave, or by utilizing X-rays, inductive or di-electric heating or high frequency electro-magnetic, supersonic, or other radiation as desirable or more convenient according to particular use factors and circumstances. Prior to installing the described needles the cannulas thereof desirably are treated with a medium which furnishes a hemorepellent film thereon to prevent clotting of blood in the needles during phlebotomy. For this purpose a monomolecular film is applied from a dilute (0.1–1%) aqueous dispersion of such substance as exemplified by either dicocodimethyl ammonium chloride or octadecyl primary amine. Also pyrogen-free water desirably is rinsed through the tubing 40 and the connected needles 47 and 50 of the recipient set B, these thereafter being oppositely inserted in and coupled to the ends of the nicked protective tubing 52 as already described.

When the "time and temperature" or heat method is used compressed air is admitted to the sterilizing chamber at the end of the sterilizing cycle to maintain a pressure of 15 p. s. i. until the equipment has cooled to 90° C. Then after the pressure has been vented the entire assembly is ready for use.

The technic for obtaining a supply of whole blood by use of the described apparatus is simple. Preliminarily the donor's arm is prepared by applying a pneumatic tourniquet to a pressure of 60 mm. mercury and disinfecting the skin over the entire area, preferably at the antecubital fossa, as by scrubbing with soap and water, the lather of which is removed as by 2% aqueous iodine which is allowed to evaporate. Local anaesthetic may be given as by raising a wheal of 1% procaine in the skin, and infiltrating the tissues about the selected vein of the donor. With the donor thus readied the protective sheath 37 is then pulled off the phlebotomy needle 32 of the donor element A and the needle is inserted in the donor's vein. The blood flows by gravity through the tubing 30 and into and through the ion-exchange column 29 where it is decalcified. Thence the non-coagulating blood passes into the bag 10 positioned at a level below the donor's arm, until the bag is full. Pressure in the tourniquet is then released. The tubing 13 beyond the column 20 is then sealed off at a point close to the bag, as by clamping, fusing or tying as by drawing tight the knot 13b, and this tubing is severed at the side of the seal-off point away from the bag, the connective link 15 also being cut; see Fig. 6. Pilot blood samples for typing, grouping, cross-matching and serology determinations are collected into the tubing 30 and the latter is sealed off as by clamping, fusing or tying distally to the column 20. The needle 32 may then be removed from the donor's vein. A number of blood samples may be segregated by sealing off the collecting tube 30 in small sections. It will be understood that the blood between the needle 32 and the decalcifying chamber 20 will clot, while that beyond the ion-exchange material will remain fluid.

During storage, the filled and hermetically sealed blood bag as represented in Fig. 6 is refrigerated at 0° C.±1°. During such refrigeration it may be held erect by insertion in a loose fitting collapsible paper tube open at the ends to promote air circulation.

The administering elements of the equipment comprise the filled bag 10 and the recipient set or element B. At the time of an infusion the end of the protective sheath 17 is cut away from the delivery tube 16 at the bottom of the bag. The coupling needle 47 is then withdrawn from the sheathing tube 52 and is inserted into and through the delivery tube 16 so as to pierce the inner sealing diaphragm 16a thereof and provide a passage for the blood. The shorter hub of this coupling needle 47 is firmly seated in the protruding open end 16b of the delivery tube 16, it being noted that the cannula of this needle and the inner coupling hub are longitudinally proportioned and arranged with respect to the length of the delivery tube 16 and the location of the sealing diaphragm 16a thereof so that the described piercing of the diaphragm, entry of the needle through it into communication with the bag interior and seating of the needle hub into the open end of the delivery tube is readily accomplished. The infusing needle 50 will then be applied to the recipient, and the blood allowed to flow, the rate being observed at the drip chamber 42. The flow may be induced by gravity, as when the bag is supported above the level of the patient where it may be suspended by means of the hanger aperture 14 at the upper end; Fig. 7. Or the infusion may be under squeezing pressure applied to the bag as by placing it under the shoulder or buttock of the recipient, Fig. 8, or otherwise as by a spring-loaded clamp engaged with the bag. For rapid infusion as in intra-arterial injection, the bag can be subjected to greater pressure by standing on it.

The apparatus of the invention is readily adaptable to more complex preservative treatment of the blood. One or more additional chambers may be incorporated in the collecting line A so that for example dessicated powder such as fibrinogen may be added to the de-ionized blood as it is collected. The deformable container or bag may be variously shaped and dimensioned and may itself be divided by flexible walls or diaphragms into a number of compartments so that portions of the blood may be separated after sedimentation has occurred. Additional inlet and outlet tubes may be sealed into the bag in the described manner. For example, noting Feb. 9, delivery tubes may be provided at the top of the bag 10A and extending into it for determined lengths, so that various fractions of the blood may be aspirated from it; by squeezing the outer walls of the collapsible bag together the volume beneath the aspirating tube may be decreased to adjust the blood level to the tube. For pediatric practice a multiple compartmented bag may be provided, as for example in Fig. 10, having a sealed-in delivery tube for each compartment and a common inlet so that a single adult donation of blood is automatically divided into for example five or more infant-size infusion quantities. After filling the several compartments may be sealed from each other and cut apart into self-contained bag units 10B, 10B, etc.

From the foregoing it will be apparent that by the present invention the collection, storage and dispensing of whole blood preserved as an unadulterated tissue free of contamination and non-subject to coagulation is made possible with a simple non-breakable light-weight compactly collapsible and expendable equipment, enabling hospitals and other agencies to set up "banks" or reserves of whole blood to be stored in any desired amount and for indefinite periods for emergency use.

It is again here noted that the apparatus, system and methods of the invention importantly include among other features the concept of ion exchange in the treatment and handling of whole blood and especially the provision of an ion-exchange medium or column through or in contact with which the blood is passed or flowed as a step in a continuous process from a donor and on into storage or use in a condition constantly sealed from contaminating air and relieved from coagulation and deterioration. Obviously the invention and particularly the feature of rendering the whole blood non-coagulative in a flow procedure is not limited with respect to the use to be made of the blood. That is, the blood may be infused immediately, or stored as described, or may be otherwise utilized, as for laboratory and research purposes; after reception from a donor and flow past the ion-exchange medium the then non-coagulative blood, for example, may be fractionated where some particular fraction or fractions, such as fibrinogen, may be desired, and the apparatus as disclosed is adapted to any such uses as well as those of whole blood banking, collection, storage, shipment and infusion or other use.

It will be understood that my invention, either as to means or method is not limited to the exemplary embodiments or steps herein illustrated or described, and I set forth its scope in my following claims.

I claim:

1. In apparatus for the collection, storage and use of whole blood, a closed deformable container having major wall areas for blood contact formed of an impermeable flexible material susceptible of sterilization and affording a chemically clean and inert glossy hemorepellent surface, a flexible collecting tube of the like material integrally joined with and opening into the container, a relatively short delivery tube of said material extending through and in sealed union with the container wall at a point spaced from the collecting tube, the delivery tube projecting externally of the container and being initially closed by a pierceable sealing diaphragm, and a protective sheath removably enclosing the projecting portion of the delivery tube.

2. Apparatus for the contamination- and coagulation-free collection, storage and infusing of whole blood, comprising a deformable hermetically sealed bag to contain the blood, a diaphragm-sealed delivery tube on the bag and adapted to receive a seal-piercing coupling needle to afford egress from the bag, and a collecting line comprising flexible tubing admitting at one end to the bag and having a phlebotomy needle at the other end, said bag and tubes being fabricated from a hermetically sealable impermeable material of good tissue tolerance, stable to sterilization and presenting to the blood only chemically clean inert glossy and hemorepellent surfaces.

3. The apparatus of claim 2 wherein the bag and tubes are formed of a synthetic plastic composition of a polyvinyl chloride resin base material.

4. The apparatus of claim 2 wherein the bag and tubes are formed of a polymer of trichlorofluoroethylene.

5. The apparatus of claim 2 wherein the bag and tubes are formed of a polyethylene composition.

6. In apparatus for the collection, storage and infusing of whole blood, a closed flexible-walled deformable and flatwise collapsible bladder-like container having inlet and outlet means and having the defining wall formed of a transparent impermeable thermoplastic resin susceptible of sterilization and affording a chemically clean and inert hemorepellent surface for blood contact and being hermetically sealable by fusing heat locally applied, the inlet means comprising compressible tubing of the container material adapted for hermetic sealing by internal wall conjunction, and the outlet means comprising tubing of the like material closed by a positively covered pierceable sealing diaphragm.

7. In apparatus according to claim 6 the construction wherein a plurality of outlet tubes communicate through and are sealed into a wall of the container, said tubes projecting to different extents within the container for removal of blood at corresponding different levels therein.

8. In apparatus according to claim 6 the construction wherein the container is formed with partitions of the like material defining isolatable compartments for subdividing an adult blood donation, and individual outlet means for the compartments.

9. Apparatus according to claim 8 wherein the plural compartments are spaced by severable areas adapting them to be cut apart for separate use.

10. Apparatus for the sterile collection and deterioration-free storage of whole blood in a system in which liquid-gas interface is eliminated, said apparatus comprising an hermetically closed deformable blood storing vessel having an integrally continuous flexible and impermeable hemorepellent wall, collecting tubing of like wall material integrally joining and opening into the vessel, a phlebotomy needle fitted in the free end of the collecting tubing and having a protective sheath removably fitted over the needle cannula, said tubing having an intermediate enlargement containing a coagulant-removing ion-exchange medium, outlet means for the vessel including a relatively short delivery tube of said wall material extending through and integrally sealed in the vessel wall, said delivery tube projecting exteriorly from the vessel and having a pierceable diaphragm initially sealing off the tube, and a severable sheath enclosing the projecting portion of the delivery tube and secured to the vessel.

11. In an apparatus for the deterioration-free collection, preservation, and administering of whole blood, a blood collecting and storing assembly comprising a closed deformable storage bag formed of an impermeable and glossy hemorepellent wall material, a flexible collecting tube of like wall material admitting through and sealed into the bag wall and having at the free end a blood-letting needle, and a chamber in closed connection in the flow line between the needle and the bag and housing a coagulant removing ion-exchange agent for passage of blood thereover.

12. In an apparatus for the sterile clot-free collection, storage and infusion of whole blood, a blood collecting and storing assembly comprising, in combination, a deformable hermetically sealed storage bag formed of a flexible impermeable hemorepellent wall material, a flexible collecting tube of like wall material admitting through and sealed into the bag wall and having at the free end a blood-letting needle, and intermediately incorporated with said collecting tube a flexible cylinder of said wall material, and a foraminous blood-flow passing supportive transverse partitioning element in the cylinder and formed of material having similar properties to blood as said wall material, said foraminous element supporting a fluent granular mass of a resinous medium adapted to remove calcium from the blood by ion exchange during passage of the blood over it.

13. In an apparatus for the sterile collection and clot-free storage of whole blood, in combination, flexible collecting tubing, an integral deformable storage bag, said bag and tube presenting repellent impermeable surfaces to the blood, and coagulation preventing means comprising an elongate chamber in closed communication with the tubing at its ends, a multiple-apertured transverse element partitioning the chamber into de-ionizing and outlet compartments and adapted for flow of de-ionized blood therethrough, the chamber and said transverse element having similar surface properties for blood as said collecting tube and bag, and an ion-exchange medium consisting of a granular de-ionizing resin in the de-ionizing chamber and of a granular size to be supported on and retained by said transverse element while maintaining blood flow through the chamber.

14. In an apparatus for the sterile collection and deterioration-free infusion and storage of whole blood including a flexible synthetic plastic receiving tube presenting an impermeable and hemorepellent inner surface, coagulation-preventing means comprising an ion-exchange chamber interposed in the tube and having an ion-exchange medium consisting of a coagulant-removing resin sealed therein, said tube and chamber permitting the continuous flow of blood.

15. For use in sealed-from-air sterile handling of whole blood, a chamber having a sterile inlet, said chamber containing a coagulant-removing medium adapted for flow-passage of the blood in coagulant-removing contact therewith, and sterile egress means from the chamber beyond said medium, said chamber, inlet and egress means presenting to the blood only hemorepellent surfaces.

16. In apparatus for the sterile coagulation-free collection, storage and infusing of whole blood, a heat-sealed bladder of impermeable elastomeric resinous material non-reactive and repellent to blood, collecting and delivery tubes of like material as the bladder communicating into it and sealed into the wall thereof, the delivery tube projecting externally of the bladder and having adjacent the bladder wall a pierceable diaphragm sealing it off, and a sheath of the bladder material removably enclosing the projecting portion of the delivery tube and fused to the bladder.

17. A vessel for the sterile coagulation-free collection, storage and infusing of whole blood, comprising a length of flexible transparent lay-flat thin-walled tubing formed by extrusion of a thermoplastic resin of marked flexure, tensile and impact strength and toughness and characterized by an impermeable chemically inert glossy-smooth hemorepellent surface, the tubing ends being brought together flatwise and integrally self welded to define a closed and hermetically sealed deformable bag, flexible tubes of similar composition extending through and sealed into the weld-sealed ends of the bag for ingress and egress respectively, the egress tube having a pierceable diaphragm initially sealing it and the ingress tube adapted for severance and sealing adjacent the bag after filling, and hanger means integral with the bag.

18. Apparatus for the sterile collection and clot-free storage of whole blood comprising a collapsible storage bag formed of a flexible transparent hemorepellent and impermeable sheet material, a flexible collecting tube of like material having one end in sealed vent-free communication with the bag, a blood-letting needle including a stainless steel cannula and a coupling and manipulating portion including aligned oppositely extending conical hubs, one of them defining the non-pointed end of the needle, the cannula extending uninterruptedly through said portion and having on the lumen wall a hemorepellent film, said needle end hub having the free end of the collecting tube expanded over it in gripping sealed relation, and a removable protective sheath for the needle cannula comprising a short length of tubing similar to the collecting tube, sealed at one end and having the other end seal fitted onto the other needle hub.

19. In apparatus for the sterile coagulation-free collection, storage and infusing of whole blood, a heat-sealed bladder of impermeable elastomeric resinous material repellent and non-wettable to blood, collecting and delivery tubes of like material as the bladder communicating into it and sealed into the wall thereof, the delivery tube projecting externally of the bladder and having adjacent the bladder wall and inwardly from the outer end of said tube a pierceable diaphragm sealing it off, and the bladder having coupled therewith a tubular needle having a piercing point and a seating portion spaced from the point and including opposed hubs, the bladder delivery tube and said needle relatively proportioned in length for piercing entrance by the needle through the sealing diaphragm of said tube and for gripping engagement of one hub of the needle seating portion in the outer end of the delivery tube while presenting the other hub for other tubular connection.

20. A blood collecting, storing and infusing kit comprising, in combination, a central bladder-like deformable container composed of a thermoplastic elastomeric material affording it a transparent thin tough glossy hemorepellent wall; a donor set including a collecting length of flexible tubing of the like material having at the free end a donor needle sealed in a removable sheath of like tubing, an ion-exchange column inserted intermediately along the tubing and comprising a larger cylinder of the like material to and from which the tubing provides inlet and outlet, a hemorepellent formaminous element transversely partitioning the cylinder and a granular mass of a decalcifying medium supported on said partitioning element, the tubing from the outlet of said ion-exchange column having sealed communication with the container and adapted for sealing off and severance adjacent the container, said container having a delivery tube of the like material leading through and sealed into the container wall at a point spaced from the tubing leading from the ion-exchange column, said delivery tube projecting from the container and having a pierceable diaphragm seal adjacent the container wall and a protective sheath over the projecting portion and sealed to the container; and a recipient set coupled with the container and comprising a length of the similar flexible tubing, coupling and infusing needles installed at opposite ends of the tubing, and a combined drip chamber and filter inserted intermediately in the tubing.

21. A blood collecting, storing and infusing kit, comprising: a flatwise collapsed sealed bag having a short projecting tubing outlet pierceably sealed and protectively sheathed; a donor set in sealed communication with the bag and including in line a donor needle and covering sheath, a main length of tubing, a decalcifying ion-exchange column with contained filter, a relatively short tubing length admitting from the column to the bag, said short length being sealable and severable adjacent the bag after filling of the latter, and a severable connecting and weight-supportive link between the column and the bag; and a recipient set including a piercing coupling needle and an infusing needle, a combined drip chamber and filter, flexible tubing connecting the drip chamber-filter with the coupling and infusing needles at opposite ends thereof, a removable protective tubing sheathing said needles at its respective ends; and wrapper means confining the bag and the donor and recipient sets in compactly packaged form; all said parts save the needles being formed of a thermoplastic elastomer affording a thin tough glossy hemorepellent wall.

22. A blood collecting, storing and infusing kit according to claim 21 wherein the lumens of the needles have a hemorepellent film thereon.

23. Apparatus for infusing whole blood comprising in combination an hermetically sealed deformable blood bag formed of a flexible transparent impermeable thermoplastic resinous hemorepellent elastomer, an outlet tube of the like material fused into the bag and having a pierceable diaphragm mounted in and initially closing it; a coupling needle for insertion and sealed seating in the outlet tube so as to puncture the diaphragm and provide egress for the blood, a flexible infusing tube of said material connected to the needle; and a similar infusing needle sealingly fitted in the free end of the infusing tube and adapted to be applied to the recipient, whereby blood from the bag may be flowed to the recipient by gravity or by deforming pressure applied to the bag as by placing it under the recipient or by standing on or otherwise externally loading the bag.

24. Apparatus according to claim 23 wherein the infusing tube integrally incorporates a combined drip chamber and filter means presenting to the blood only hemorepellent surfaces.

25. Apparatus for collecting and handling whole blood comprising a blood receiving and dispensing container having separate sealable sterile inlet and outlet ports, a closed blood-flow chamber having a blood-admitting inlet and an outlet, a phlebotomy needle and hemorepellent tubing coupling it to the flow chamber inlet, a coagulant-removing agent housed in the flow chamber, hemorepellent tubing coupling the flow chamber outlet with the container inlet port, and further hemorepellent closed-channel means leading from the container outlet port.

26. Apparatus according to claim 25 wherein the coagulant-removing agent in the flow chamber is an ion-exchange resin.

27. Apparatus according to claim 25 wherein the coagulant-removing agent in the flow chamber is a sulfonated polystyrene divinyl benzene copolymer.

References Cited in the file of this patent

UNITED STATES PATENTS

| | | |
|---|---|---|
| 1,630,248 | Aguilar | May 31, 1927 |
| 1,703,389 | Coles | Feb. 26, 1929 |
| 1,786,090 | Schmidt et al. | Dec. 23, 1930 |
| 1,863,994 | Pariotti | June 21, 1932 |
| 2,087,780 | Powell | July 20, 1937 |
| 2,129,983 | Bacon | Sept. 13, 1938 |
| 2,186,987 | Nesset | Jan. 16, 1940 |

(Other references on following page)

UNITED STATES PATENTS

| | | |
|---|---|---|
| 2,253,571 | Miller | Aug. 26, 1941 |
| 2,328,569 | McGaw | Sept. 7, 1943 |
| 2,341,114 | Novak | Feb. 8, 1944 |
| 2,362,537 | Butler | Nov. 14, 1944 |
| 2,367,806 | Shaw | Jan. 23, 1945 |
| 2,409,734 | Bucher | Oct. 22, 1946 |
| 2,504,482 | Goldman | Apr. 18, 1950 |
| 2,570,639 | Cahan | Oct. 9, 1951 |

FOREIGN PATENTS

| | | |
|---|---|---|
| 573,611 | Great Britain | Nov. 28, 1945 |
| 632,883 | Germany | July 15, 1936 |

OTHER REFERENCES

"A New Method of Preventing Blood Coagulation," Arthur Steinberg, Proc. Soc. Exp. Biol. Med., June 1944, pp. 124–127.